United States Patent Office 2,987,422
Patented June 6, 1961

---

2,987,422
PROCESS FOR THE PRODUCTION OF ELECTRICALLY CONDUCTIVE COATINGS AND PRODUCTS OBTAINED BY THIS PROCESS
Edgard Brichard, Jumet, Emile Plumat, Gilly, Gerard Meunier, Jumet, and Edouard Deliere, Marcinelle, Belgium, assignors to Union des Verreries Mecaniques Belges, Societe Anonyme, Charleroi, Belgium, a Belgian company
No Drawing. Filed Sept. 12, 1958, Ser. No. 760,559
Claims priority, application Belgium Sept. 21, 1957
11 Claims. (Cl. 117—211)

The present invention relates to the production of transparent and stable electrically conductive coatings on surfaces of glass or ceramic materials.

It is known to produce electrically conductive coatings by projecting on to the surface of a previously heated object, tin compounds in an oxidising medium and, more especially, a halide such as stannous or stannic chloride. For the purpose of rendering these coatings more uniform from the viewpoint of electrical conductivity, appearance and transparency, and for freeing them from fogging and streaking, it has already been proposed to add to the tin compound, metallic or other compounds which, although incapable in themselves of forming electrically conductive coatings, are intended to promote the formation on the surface of the object to be treated of a tin oxide consisting of particles disposed in the form of a semi-conductor lattice having the desired number of gaps and flaws producing the electrical conductivity of the coating regularly distributed over the entire surface of the object. Although the adjuvants proposed for this purpose are fairly numerous—there may be mentioned by way of example compounds of fluorine, vanadium, cobalt, zinc, cadmium, indium, antimony, tellurium and tungsten—it is difficult to obtain industrially with the aid of these compounds electrically conductive coatings which are satisfactory in all respects, namely in regard to transparency, low iridescence under reflected light and appropriate electrical resistivity, that is to say, resistivity below 100 ohms per square surface.

It has been discovered that electrically conductive coatings of high transparency which exhibit low iridescence under reflected light and possess an electrical resistance of the order of from 30 to 90 ohms per square surface can be obtained in accordance with the invention by projecting on to the previously heated surface of the object to be treated, in an oxidising medium, a tin halide simultaneously with any compound chosen from a group comprising molybdenum and columbium, which compound may be accompanied by a fluorine compound.

Preferably, from 0.1 to 10 parts of the compound chosen from this group are employed to 100 parts of tin halide. The compound chosen is advantageously any oxyhalide of molybdenum or of columbium, such as molybdenum oxytetrachloride, $MoOCl_4$, or columbium oxytrichloride, $CbOCl_3$, to which a fluoride such as ammonium fluoride may be added.

For the projection of the molybdenum or columbium chloride, the latter is brought to a temperature sufficient to impart thereto a vapour pressure such that a current of gas can become charged with a desired quantity of evolved vapours and carry them towards projection nozzles directed on to the surface to be treated, either together with tin halide vapours or through separate conduits, for example in the manner described in applicants' co-pending patent application Serial No. 760,651, filed September 12, 1958, and entitled "Process and Apparatus for Obtaining Electrically Conductive Coatings on the Surface of Objects Consisting of glass or Ceramic Materials."

The quantity of moylbdenum or columbium compound employed is between 0.1 and 10 parts by weight to 100 parts of tin halide, but it may vary in accordance with the particular conditions of application in each case, for example, in accordance with the composition of the object and the temperature to which it has been brought before the treatment. Thus, for producing on a glass surface a transparent coating having an electrical resistivity of the order of 80 ohms per square unit surface or less, good results have been obtained by projecting on to the glass, which is at a temperature of about 500° C., one or more currents of preferably inert gas carrying, with 100 parts of stannous chloride, $SnCl_2$, 0.5 to 5 parts of $MoOCl_4$, or
0.5 to 3 parts of $MoOCl_4$ and 1 to 2 parts of $NH_4F$, or
0.3 to 2 parts of $CbOCl_3$, the oxidising medium being created by one or more currents of oxygen. It is obvious that the quantity of compounds to be projected on to the object per unit surface, and the exact proportion of adjuvant in relation to the tin salt, must be determined in each case in the light of all the factors involved in the production of a regular, stable electrically conductive coating possessing the desired ohmic resistance.

Naturally, the invention is not limited to the examples given, and modifications could be made thereto without departing from the scope of the invention.

We claim:
1. In a process for the production of a transparent, stable, electrically-conductive coating on the surface of a glass or ceramic object by applying a tin halide in an oxidizing medium to the heated surface of said object, the improvement comprising applying to said surface simultaneously with said tin halide an oxyhalide of a metal selected from the group consisting of molybdenum and columbium.
2. The process of claim 1 wherein said oxyhalide is accompanied by a fluorine compound.
3. The process of claim 1 wherein there are 0.1 to 10 parts by weight of said oxyhalide to 100 parts of tin halide.
4. The process of claim 1 wherein said tin halide is a chloride.
5. The process of claim 1 wherein said metal is molybdenum.
6. The process of claim 5 wherein said oxyhalide is molybdenum oxytetrachloride.
7. The process of claim 6 wherein said oxyhalide of molybdenum is accompanied by a fluorine compound.
8. The process of claim 7 wherein said fluorine compound is ammonium fluoride.
9. The process of claim 1 wherein said metal is columbium.
10. The process of claim 9 wherein said oxyhalide is columbium oxytrichloride.
11. A glass or ceramic object coated by the process of claim 1.

References Cited in the file of this patent
UNITED STATES PATENTS

| | | |
|---|---|---|
| 2,564,706 | Mochel | Aug. 21, 1951 |
| 2,692,836 | McAuley | Oct. 26, 1954 |
| 2,772,190 | Haayman et al. | Nov. 27, 1956 |

FOREIGN PATENTS

| | | |
|---|---|---|
| 693,127 | Great Britain | June 24, 1953 |